United States Patent
Shabbir et al.

(10) Patent No.: US 11,193,377 B2
(45) Date of Patent: Dec. 7, 2021

(54) TURBOMACHINE AIRFOIL TO REDUCE LAMINAR SEPARATION

(71) Applicant: General Electric Company, Schenectady, NY (US)

(72) Inventors: Aamir Shabbir, Westlake, OH (US); Christopher Robert Berndt, West Chester, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 16/695,358

(22) Filed: Nov. 26, 2019

(65) Prior Publication Data
US 2021/0156258 A1    May 27, 2021

(51) Int. Cl.
*F01D 5/12* (2006.01)

(52) U.S. Cl.
CPC ............. *F01D 5/12* (2013.01); *F05D 2220/32* (2013.01); *F05D 2230/00* (2013.01); *F05D 2240/305* (2013.01); *F05D 2240/306* (2013.01)

(58) Field of Classification Search
CPC ............... F01D 5/12; F05D 2240/305; F05D 2240/306; F05D 2220/32; F05D 2230/00
See application file for complete search history.

(56) References Cited

U.S. PATENT DOCUMENTS

| 2,819,837 | A | 1/1958 | Loeb |
| 3,692,425 | A | 9/1972 | Erwin |
| 5,313,700 | A | 5/1994 | Dorman |
| 6,099,249 | A | 8/2000 | Hashimoto |
| 6,416,289 | B1 | 7/2002 | Ramesh et al. |
| 6,779,973 | B2 | 8/2004 | Ito et al. |
| 7,207,772 | B2 | 4/2007 | Johann |
| 7,878,759 | B2 | 2/2011 | Mills et al. |
| 8,133,012 | B2 | 3/2012 | Nagai et al. |
| 9,752,589 | B2 | 9/2017 | Sonoda et al. |
| 2019/0101002 | A1* | 4/2019 | Duffin .................. F04D 29/384 |

OTHER PUBLICATIONS

Liepmann, The Interaction between Boundary Layer and Shock Waves in Transonic Flow, Journal of the Aeronautical Sciences, vol. 13, No. 12, Dec. 1946, pp. 623-637. (Abstract Only) https://doi.org/10.2514/8.11473.

* cited by examiner

*Primary Examiner* — Jacob M Amick
*Assistant Examiner* — Charles J Brauch
(74) *Attorney, Agent, or Firm* — Fitch, Even, Tabin & Flannery, LLP (57) ABSTRACT

A method of controlling a transition from a laminar flow to a turbulent flow for an airfoil of a turbomachine includes forming an airfoil. The airfoil defines a span extending between a root and a tip and a chord extending between a leading edge and a trailing edge. The airfoil includes a suction side surface and a pressure side surface, opposite the suction side surface, each extending between the leading edge, the trailing edge, the root, and the tip. The method also includes finishing a majority of the suction and pressure side surfaces in order to form a finished surface. The finished surface defines a first roughness. The method additionally includes leaving at least a portion of the suction side surface and/or pressure side surface unfinished in order to form an unfinished surface. Furthermore, the unfinished surface defines a second roughness greater than the first roughness.

18 Claims, 7 Drawing Sheets

```
┌─────────────────────────────────────────────┐
│ FORM AN AIRFOIL INCLUDING A SUCTION SIDE SURFACE │
│ EXTENDING BETWEEN THE LEADING EDGE, THE TRAILING │
│ EDGE, THE ROOT, AND THE TIP, THE AIRFOIL FURTHER │
│ INCLUDING A PRESSURE SIDE SURFACE, OPPOSITE THE │
│ SUCTION SIDE SURFACE, EXTENDING BETWEEN THE LEADING │
│ EDGE, THE TRAINING EDGE, THE ROOT, AND THE TIP │ —202
└─────────────────────────────────────────────┘
                      │
                      ▼
┌─────────────────────────────────────────────┐
│ FINISH A MAJORITY OF THE SUCTION SIDE SURFACE AND │
│ PRESSURE SIDE SURFACE IN ORDER TO FORM A FINISHED │
│ SURFACE, WHEREIN THE FINISHED SURFACE DEFINES │ —204
│ A FIRST ROUGHNESS │
└─────────────────────────────────────────────┘
                      │
                      ▼
┌─────────────────────────────────────────────┐
│ LEAVE AT LEAST A PORTION OF AT LEAST ONE OF THE │ —206
│ SUCTION SIDE SURFACE OR PRESSURE SIDE SURFACE │
│ UNFINISHED IN ORDER TO FORM AN UNFINISHED SURFACE, │
│ WHEREIN THE UNFINISHED SURFACE DEFINES A SECOND │
│ ROUGHNESS GREATER THAN THE FIRST ROUGHNESS │
└─────────────────────────────────────────────┘
```

FIG. 8

TURBOMACHINE AIRFOIL TO REDUCE LAMINAR SEPARATION

FIELD

The present subject matter relates generally to airfoils, and more particularly, to airfoils for a gas turbine engine with unfinished portions to reduce laminar separation.

BACKGROUND

A turbomachine, such as a gas turbine engine, generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Turbofan gas turbine engines typically include a fan assembly that channels air to the core gas turbine engine and to a bypass duct. During operation, the fan blades of the fan operates similarly to a propeller by supplying air downstream to the gas turbine engine and also pushing air through the exhaust nozzle at an increased velocity to provide thrust for the aircraft. However, in certain situations the fan blades may encounter unfavorable aerodynamic phenomena that adversely affect engine performance. For instance, local flow separation and/or unsteady aerodynamic loadings may cause unfavorable boundary layer and shock development.

Generally, the boundary layer will transition from a laminar or approximately laminar flow at an upstream portion of the fan blade to a turbulent flow at a downstream portion of the fan blade. Under many circumstances, the laminar flow may generally be more efficient and desirable than the turbulent airflow. However, under certain circumstances, the laminar boundary layer can undergo a laminar separation when interacting with a shock. Such laminar separation may be undesirable and cause a pressure loss when interacting with the shock that may be higher than that for a fully turbulent boundary layer interacting with the shock.

As such, there is a need for an airfoil that enables a controlled transition from a laminar to a turbulent flow upstream of a shock condition.

BRIEF DESCRIPTION

Aspects and advantages will be set forth in part in the following description, or may be obvious from the description, or may be learned through practice of the invention.

In one aspect, the present subject matter is directed to a method of controlling a transition from a laminar flow to a turbulent flow for an airfoil of a turbomachine. The method includes forming an airfoil defining a span extending along a spanwise direction between a root and a tip. The airfoil further defines a chord extending along a chordwise direction between a leading edge and a trailing edge. The airfoil includes a suction side surface extending between the leading edge, the trailing edge, the root, and the tip. The airfoil further includes a pressure side surface, opposite the suction side surface, extending between the leading edge, the trailing edge, the root, and the tip. The method also includes finishing a majority of the suction side surface and pressure side surface in order to form a finished surface. Moreover, the finished surface defines a first roughness. The method also includes leaving at least a portion of one or more of the suction side surface or pressure side surface unfinished in order to form an unfinished surface. Furthermore, the unfinished surface defines a second roughness greater than the first roughness.

In one embodiment, the method may further include transitioning, utilizing the unfinished surface, a fluid flow across the airfoil from an approximately laminar flowpath into a turbulent flowpath. In another embodiment, leaving at least a portion of one or more of the suction side surface or pressure side surface unfinished may include leaving at least a portion of one or more of the suction side surface or pressure side surface configured to be upstream of an expected shock boundary condition of the airfoil unfinished in order to form the unfinished surface. In a further embodiment, leaving at least a portion of one or more of the suction side surface or the pressure side surface unfinished in order to form unfinished surface comprises leaving at least a portion of the suction side surface unfinished.

In another embodiment, finishing a majority of the suction side surface and pressure side surface in order to form the finished surface may include sanding a majority of the suction side surface and pressure side surface. In such an embodiment, leaving at least a portion of one or more of the suction side surface or pressure side surface unfinished in order to form the unfinished surface may include leaving at least a portion of at least one the suction side surface or pressure side surface unsanded. In an additional or alternative embodiment, finishing a majority of the suction side surface and pressure side surface in order to form the finished surface may include applying a treatment to a majority of the suction side surface and pressure side surface. In such an embodiment, leaving at least a portion of one or more of the suction side surface or pressure side surface unfinished in order to form the unfinished surface may include leaving at least a portion of one or more of the suction side surface or pressure side surface untreated.

In an additional embodiment, the method may further include coupling a sheath to one of the leading edge or the trailing edge of the airfoil. The sheath may extend partially along the span on one or both of the pressure side surface or suction side surface to one or more seams. In such an embodiment, finishing a majority of the suction side surface and pressure side surface in order to form the finished surface may include smoothing a transition between the sheath and the airfoil along a majority of the one or more seams. Further, leaving at least a portion of one or more of the suction side surface or pressure side surface unfinished in order to form the unfinished surface may include leaving at least a portion the seam unsmoothed.

In another aspect, the present subject matter is directed to an airfoil for a turbomachine defining a span extending in a spanwise direction between a root and a tip. The airfoil further defines a chord extending along a chordwise direction between a leading edge and a trailing edge. The airfoil includes a suction side surface extending between the leading edge, the trailing edge, the root, and the tip. The airfoil further includes a pressure side surface, opposite the suction side surface, extending between the leading edge, the trailing edge, the root, and the tip. The airfoil additionally includes a finished surface including a majority of a combination of the suction side surface and the pressure side surface. The finished surface defines a first roughness. Further, the airfoil includes an unfinished surface including at least a portion of the remaining suction side surface, pressure side surface, or both. Moreover, the unfinished surface defines a second roughness greater than the first roughness.

In one embodiment, the unfinished surface may be positioned along the chord such that the unfinished surface is configured to be upstream of an expected shock boundary condition of the airfoil. In another embodiment, the unfinished surface may be configured to transition a fluid flow across the airfoil from an approximately laminar flowpath into a turbulent flowpath. In an additional embodiment, the unfinished surface may be positioned on the suction side surface. In another embodiment, the unfinished surface may define a spanwise length extending along the spanwise direction between 10% and 40% of a length of the span. In a further embodiment, the unfinished surface may be positioned at least 40% of the span from the root. In one exemplary embodiment, the unfinished surface may define a chord-wise length extending along the chordwise direction between 1% and 10% of a length of the chord. In a further embodiment, the unfinished surface may be position between 5% and 75% of the chord. In one particular embodiment, the airfoil may be configured as a fan blade of the turbomachine.

In a further embodiment, the finished surface may include a sanded surface, and the unfinished surface may include an unsanded surface. In another embodiment, the finished surface may include a treated surface, and the unfinished surface may include an untreated surface. In an additional or alternative embodiment, the airfoil may include a leading edge sheath coupled to the leading edge of the airfoil and extending partially along the span on one or both of the pressure side surface or suction side surface to one or more seams. In such an embodiment, at least a portion of the one or more seams may include the unfinished surface. In another embodiment, the airfoil may include a trailing edge sheath coupled to the trailing edge of the airfoil and extending partially along the span on one or both of the pressure side surface or suction side surface to one or more seams. In such an embodiment, at least a portion of the one or more seams may include the unfinished surface. It should be further understood that the airfoil may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

Methods for transitioning a flow over an airfoil from a laminar flow to a turbulent flow and associated airfoils are generally provided. The method includes forming an airfoil of a turbomachine, such as a gas turbine engine, including a suction side and a pressure side. The method includes finishing a majority of an outer surface of the suction and pressure sides in order to form a finished surface. The finished surface may generally reduce the roughness of the outer surface of the airfoil and enable a laminar flowpath over the airfoil that increases efficiency. The method also includes leaving a portion of the outer surface of the suction side or the pressure side unfinished to form an unfinished surface. The unfinished surface may have an increased roughness compared to the finished surface. The unfinished surface may be utilized to introduce turbulence into an otherwise laminar or substantially laminar flowpath over the outer surface of the airfoil. Further, the unfinished surface may be placed upstream of an expected shock boundary condition on the outer surface of the airfoil. As such, by introducing turbulence upstream of the shock, laminar separation caused by the shock may be eliminated or reduced. Moreover, by reducing laminar separation, an associated pressure drop over the shock may be reduced and thus increase the efficiency of the turbomachine. Furthermore, by leaving a portion of the outer surface of the airfoil unfinished, additional machining or finishing step to introduce roughness to the outer surface may be unnecessary. As such, the methods described herein may be implemented with fewer steps and reduce the complexity of the manufacturing process as well as reduce associated costs.

Figure 1:
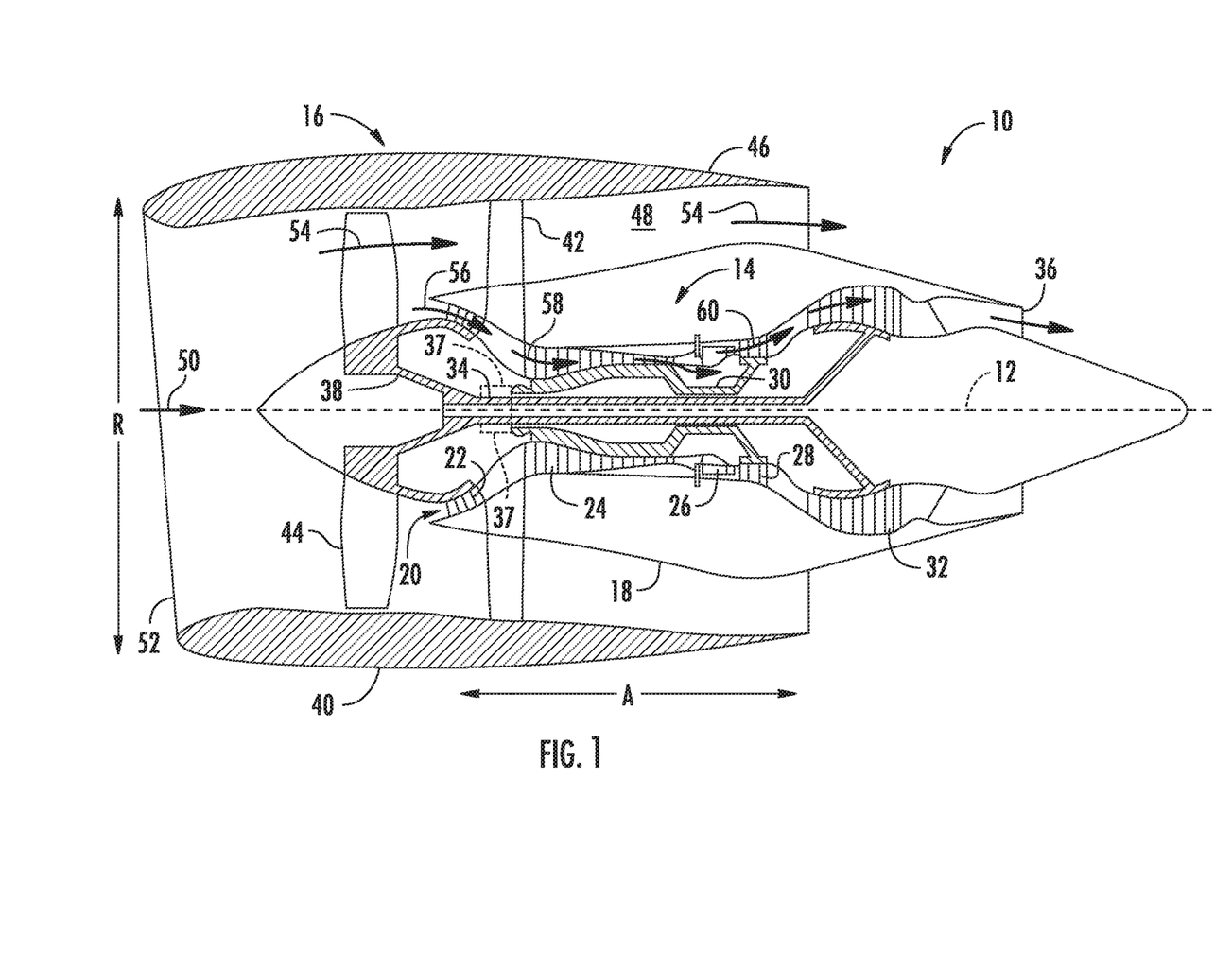
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a turbomachine configured as a gas turbine engine 10 that may be utilized within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units. Further, though described in reference to an exemplary gas turbine engine, the following description is equally applicable to other configuration of an aero-engine, such as an electrically powered aero-engine.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) axial compressor and/or centrifugal compressor (LP compressor 22) for increasing the pressure of the air that enters the core engine 14 to a first pressure level. A multi-stage, axial-flow high pressure (HP) compressor and/or centrifugal compressor (HP compressor 24) may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products may be expelled from the core engine 14 via an exhaust nozzle 36 to provide propulsive jet thrust.

Figure 2:
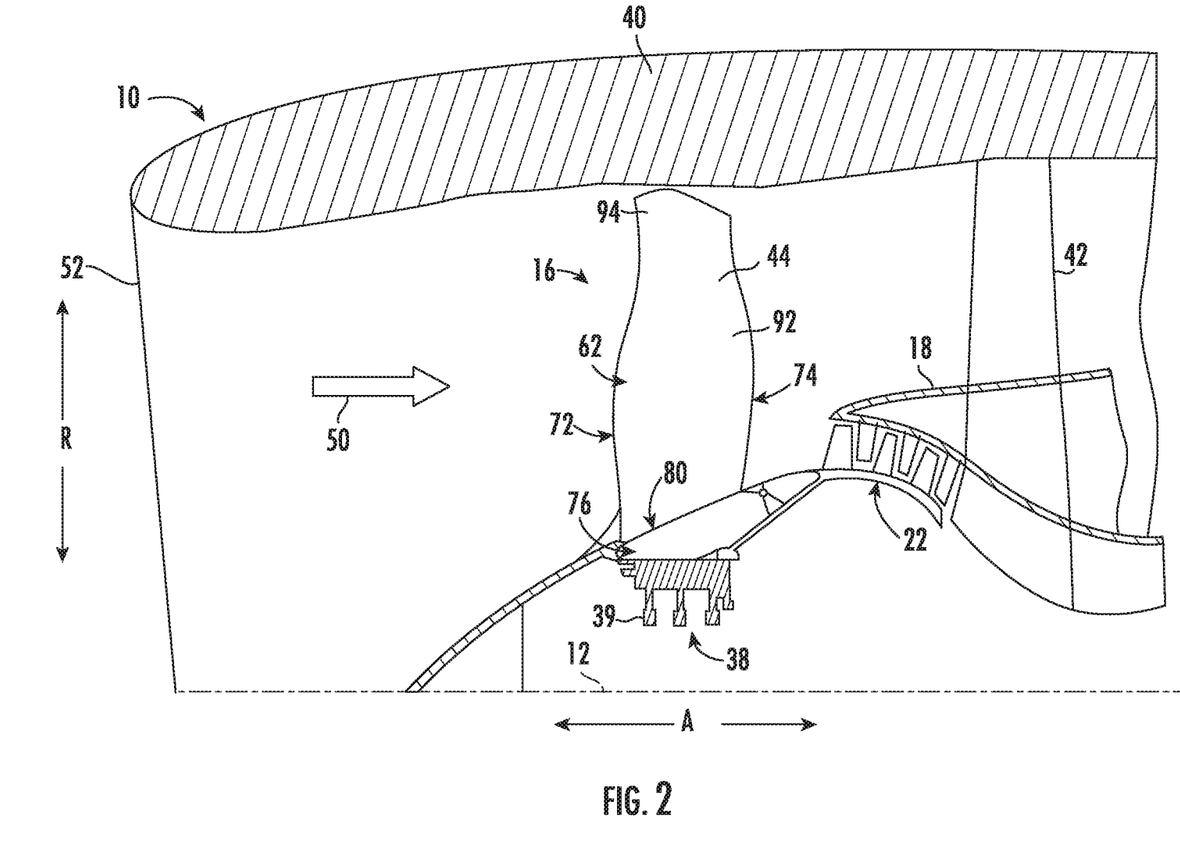
FIG. 2 illustrates a cross-sectional view of a fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. For example, a speed reduction device may generally connect a segment of the LP shaft 34 driving the LP compressor 22 and a segment of the LP shaft 34 driven by the LP turbine 32. Additionally, or alternatively, a speed reduction device may connect a segment of the HP shaft 30 driving the HP compressor 24 and a segment of the HP shaft 30 shaft driven by the HP turbine 28.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
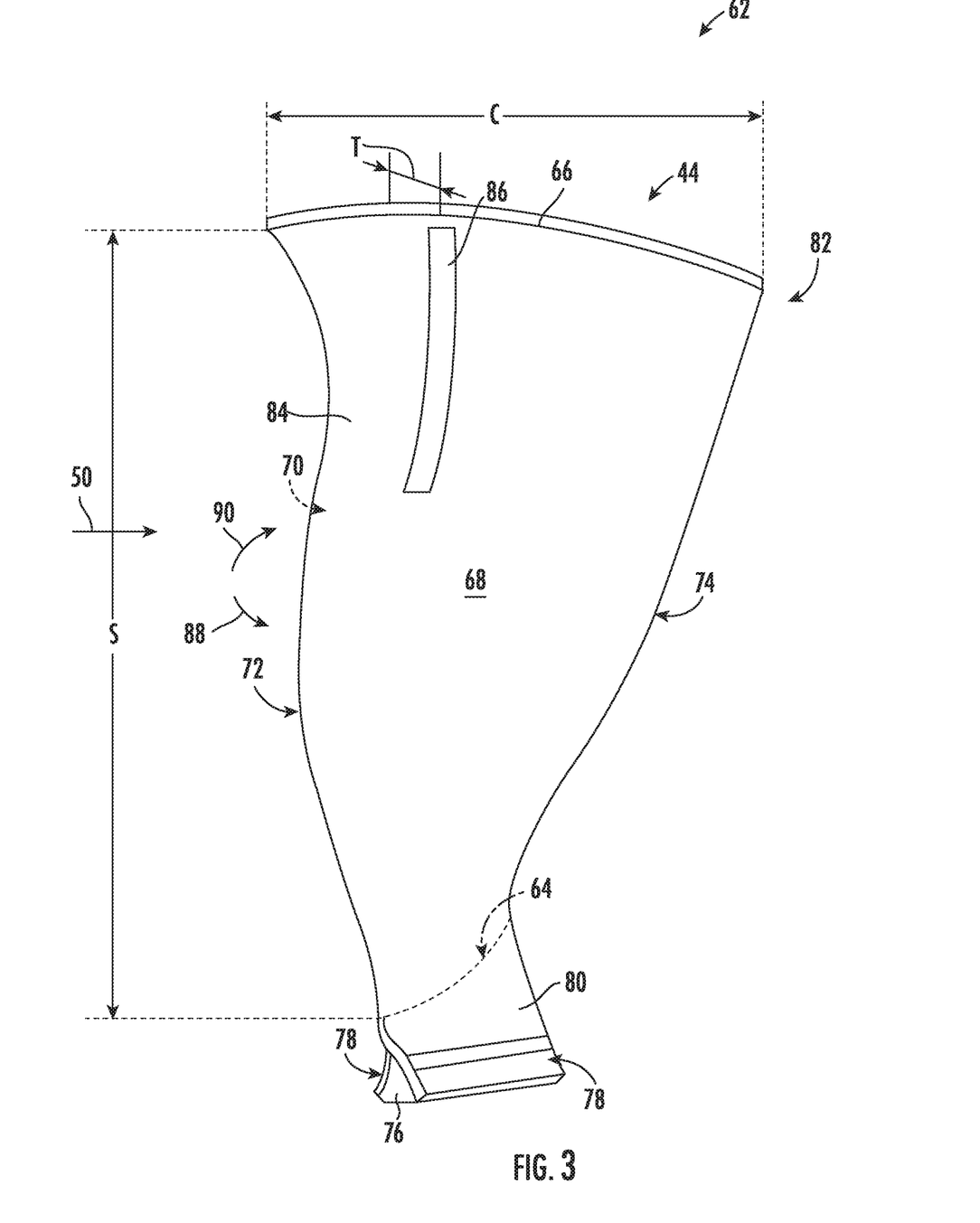
FIG. 3 illustrates an embodiment of the fan blade of the fan section of FIGS. 1 and 2 in accordance with aspects of the present subject matter, particularly illustrating finished and unfinished surfaces of the fan blade.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each airfoil 62 may define a span S extending radially outwardly along a spanwise direction from an airfoil root 64 to an airfoil tip 66. The airfoil 62 may further define a chord C extending along a chordwise direction between a leading edge 72 and a trailing edge 74. Further, a local chord may vary along the span S of the airfoil 62. For instance, in the depicted embodiment, the local chord increases along the span S toward the airfoil tip 66. Though, in other embodiments, the local chord may be approximately constant throughout the span S or may decrease from the airfoil root 64 to the airfoil tip 66. Similarly, a local span may vary along the chord C of the airfoil 62. A suction side 68 and a pressure side 70 of the airfoil 62 extend from the airfoil's leading edge 72 to a trailing edge 74 and between the airfoil root 64 and airfoil tip 66 along the span.

Furthermore, the suction side 68 may be opposite the pressure side 70 to define a thickness T of the airfoil 62 extending along a thickness direction between the suction side 68 and the pressure side 70. Furthermore, a local thickness of the airfoil 62 may be constant (e.g., thickness T) or may vary along one or both of the span S or chord C. For instance, the local thickness may generally decrease along the span S toward the airfoil tip 66. Additionally, the airfoil 62 may define an approximately constant local thickness along the chord C at each point along the span S. Or, in other embodiments, at least one point along the span S of the airfoil 62 may define a variable thickness along the chord C. For instance, the airfoil 62 may define a maximum thickness at a position along the chord C at each point along the span S.

Optionally, each airfoil 62 (such as fan blade 44) may include an integral component having an axial dovetail 76 with a pair of opposed pressure faces 78 leading to a transition section 80. When mounted within the gas turbine engine 10, as illustrated in FIG. 2, the dovetail 76 may be disposed in a dovetail slot of the fan rotor disk 39, thereby attaching the fan blades 44 to the fan rotor 38. However, in other embodiments, it should be appreciated that the dovetail 76 may have any other configuration to couple the airfoil 62 to a rotating shaft (e.g., the HP shaft 30 or LP shaft 34) of the gas turbine engine 10. Furthermore, the airfoil 62 may include a plurality of composite plies extending from the leading edge 72 to the trailing edge 74 and between the airfoil tip 66 and the airfoil root 64. For instance, one or more composite plies may extend from the airfoil tip 66 to the airfoil root 64. Or, in further embodiments, one or more composite plies may be positioned in an end-to-end arrangement. For instance, two composite plies may be arranged end-to-end to extend along the spanwise direction S from the airfoil root 64 to the airfoil tip 66. Though, in further embodiments, more than two composite plies may be arranged end-to-end to extend along the spanwise direction S, such as three or more composite plies. In additional or alternative embodiments, the airfoil 62 may be an integral solid piece that may be formed with the dovetail 76 via casting or additive manufacturing.

Furthermore, the airfoil 62 may include an outer surface 82. As an example, the outer surface 82 of the suction side 68 and pressure side 70 may be exposed to the airflow 50 passing through the fan blades 44 as described generally in regard to FIG. 1. Generally, the airflow 50 passing over the airfoil 62 splits into pressure side air 90 traveling over the pressure side 70 and suction side air 88 that travels over the suction side 68. Further, the pressure side air 90 may travel over the pressure side 70 of the airfoil 62 at an increased pressure but at a reduced velocity. On the other hand, the suction side air 88 generally travels over the suction side 68 of the airfoil 62 at a decreased pressure but at an increased velocity relative to the pressure side air 90 passing over the pressure side 70. Moreover, the air 88, 90 passing over the suction and pressure sides 68, 70 generally meet downstream of the trailing edge 74 of the airfoil 62.

It should be appreciated that one or both of the suction side air 88 or the pressure side air 90 may move faster than the speed of sound (e.g., supersonic flow) for a portion of the span S and/or chord C. For example, the suction side air 88 that moves generally faster than the pressure side air 90 may transition from subsonic to supersonic flow as the suction side air 88 is accelerated on the suction side 68. Furthermore, it should be appreciated that the suction side air 88 may only transition to supersonic flow toward the airfoil tip 66, which moves at a faster speed than the airfoil root 64. For instance, the suction side air 88 traveling over the outer 60% of the span S of the airfoil 62 may transition to supersonic flow at some point along the chord C. However, in other embodiment, the entire airflow over the airfoil 62 may initially be supersonic. Furthermore, the supersonic airflow may transition to subsonic airflow at some point along the chord C of the airfoil 62. As will be described in more detail below in reference to FIGS. 4 and 5, this transition from supersonic to subsonic flow may cause a shock and be associated with adverse effects on the boundary layer of the airflow 50 passing over the airfoils 62 and thus adversely affect the performance of the gas turbine engine 10. As such, one or more features that alter the airflow 50 passing over the airfoil 62 may be desirable in order to mitigate the effects the shock has on the performance of one or more airfoils 62 of the gas turbine engine 10, such as fan blades 44. Generally, as described in more detail in reference to FIGS. 4 and 5, the features may be configured to transition a laminar or approximately laminar flow into a turbulent flow in order to mitigate the effects of laminar separation caused by the shock.

As shown in FIG. 3, the outer surface 82 of the airfoil may include a finished surface 84. The finished surface 84 generally promotes a laminar flow over the outer surface 82 of the airfoil 62 (such as a fan blade 44, a rotor blade of the compressors 22, 24 and/or rotor blade of the turbine 28, 32. The efficiency of the airfoil 62 may be enhanced if the aerodynamic drag produced by the airfoil 62 is reduced. Generally, a laminar boundary layer over the outer surface 82 of the airfoil 62 may promote the formation of a laminar boundary layer. Furthermore, the promotion of a laminar boundary layer may be accomplished by reducing or avoiding turbulence formation over the outer surface 82 of the airfoil 62. For example, the finished surface 84 may generally be smoothed in order to promote the laminar boundary layer. As such, it should be appreciated that a smooth surface may generally produce less turbulence in a fluid flow over the outer surface 82 relative to a rougher surface.

Various procedures may be utilized in order to produce the finished surface 84 such that the finished surface 84 is smoother than the outer surface 82 before the finishing procedure, e.g., defining a first roughness smoother than the outer surface 82 before the finishing procedure. For instance, the outer surface 82 may be sanded in order to produce the finished surface 84. As an additional or alternative example, a treatment may be applied over the outer surface 82 in order to provide the smoother finished surface 84. For example, the treatment may be an outer layer adhered, glued, or otherwise fixed to the outer surface 82 of the airfoil 62 in order to provide the smoother finished surface 84. In an additional or alternative embodiment, the treatment may be sprayed and/or painted to the outer surface 82 in order to provide the smoother finished surface 84. It should be appreciated that the finished surface 84 may include the majority of the outer surface 82 of the suction side 68 and/or the pressure side 70. More particularly, the majority of the outer surface 82 may be finished in order to form the finished surface 84. For example, the finished surface 84 may include the majority of the combination of the outer surface 82 of the suction side 68 and pressure side 70. In an additional or alternative embodiment, the finished surface may include the entire outer surface 82 of the pressure side 70 or suction side 68. Furthermore, it should be appreciated that a person of ordinary skill in the art may utilize other methods and procedures to smooth the outer surface 82 of the airfoil 62, and the disclosure here is equally applicable to any other method of producing a finished surface 84.

Figure 4:
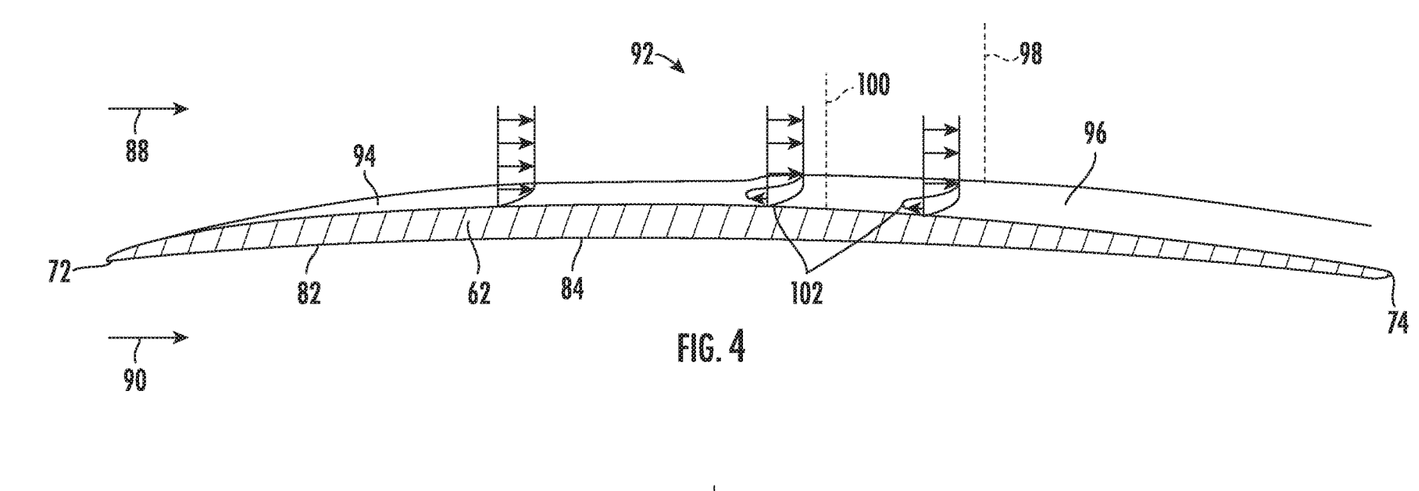
FIG. 4 illustrates cross-sectional view and boundary layer of an airfoil in accordance with aspects of the present subject matter, particularly illustrating the boundary layer on the suction side of an airfoil with only a finished surface.
Figure 5:
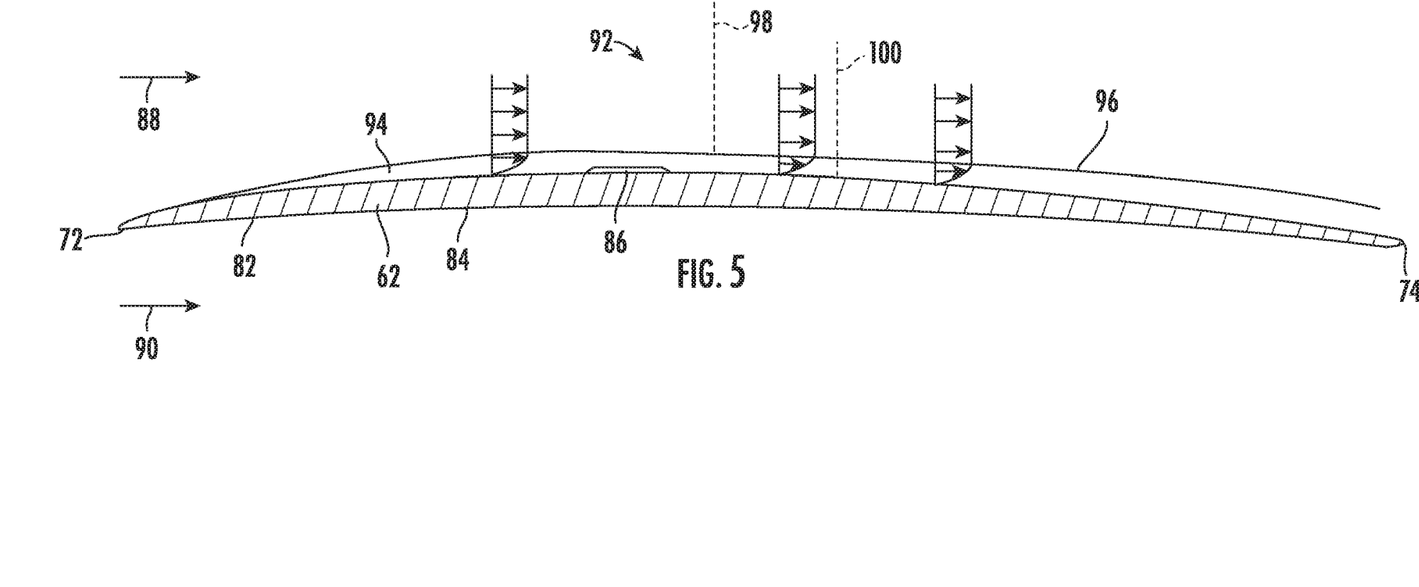
FIG. 5 illustrates a cross-sectional view and boundary layer of another embodiment of an airfoil in accordance with aspects of the present subject matter, particularly illustrating the boundary layer on the suction side of an airfoil with an unfinished surface.

As described in more detail in reference to FIGS. 4 and 5, though the laminar boundary layer may generally be desirable to reduce drag on the airfoil 62, in certain situations it may be advantageous to introduce turbulence into the fluid flow over the outer surface 82 of the airfoil 62. For example, it may increase the efficiency of the airfoil 62 to introduce turbulence upstream of a shock condition along the chord C of the airfoil 62. As such, the airfoil 62 may include an unfinished surface 86 along one or both of the outer surfaces 82 of the suction side 68 or pressure side 70. More particularly, the unfinished surface 86 may include the remaining outer surface 82 of the airfoil 62 not finished during the procedure to produce the smoother finished surface 84. For example, during the procedure to produce the finished surface 84, a portion of the outer surface 82 of the suction side 68 and/or pressure side 70 may be left unfinished to form the unfinished surface 86. As such, the unfinished surface 86 may define a second roughness less smooth than the first roughness of the finished surface 84. For example, the second roughness may be the roughness of the outer surface 82 before the procedure to produce the finished surface 84. In several embodiments, the unfinished surface 86 may be strategically placed along the chord C of the outer surface 82 of the suctions side 68 and/or pressure side 70 to be upstream of a location of an expected shock boundary condition of the airfoil 62 (e.g., where the airflow transitions from a supersonic flow to a subsonic flow). Moreover, the increased roughness of the unfinished surface 86 compared to the finished surface 84 may introduce turbulence into the airflow, such as upstream of the location of the expected shock boundary condition.

In the exemplary embodiment of FIG. 3, the unfinished surface 86 may be positioned on the suction side 68 of the outer surface 82. As described generally above, the fluid flow over the suction side 68 of the outer surface 82 may be accelerated. As such, a shock boundary condition may be more likely to occur on the suction side 68 of the airfoil 62 as compared to the pressure side 70 of the airfoil 62. Moreover, it may be desirable to positon the unfinished surface 86 of the suction side 68 of the outer surface 82 in order to introduce turbulence upstream of the expected location of the shock boundary condition. However, in additional or alternative embodiments, the unfinished surface 86 may be positioned at any suitable location along the outer surface 82 of the airfoil 62. For example, one or more unfinished surfaces 86 may be positioned on the outer surface 82 at the pressure side 70, leading edge 72, and/or trailing edge 74.

In embodiments where the finished surface 84 includes a sanded surface, the unfinished surface 86 may include an unsanded surface. For example, the majority of the outer surface 82 may be sanded in order to produce the finished surface 84. Moreover, the outer surface 82 may not be sanded in strategic locations along the outer surface 82 in order to provide the unfinished surface 86. In one embodiment, the outer surface 82 of the airfoil 62 may be marked in order to assist in determining the appropriate location for the unfinished surface 86 prior to the sanding procedure utilized to produce the finished surface 84. In an additional or alternative embodiment, a protective layer may be provided at the desired location of the unfinished surface 86. For example, a temporary layer may be adhered or otherwise affixed to the outer surface 82 of the airfoil 62 such that the outer surface 82 may be sanded to produce the finished surface 84. After completion of the sanding procedure, the temporary layer may be removed, leaving an unfinished surface 86 of the desired size and shape and positioned at the desired location of the unfinished surface 86. Furthermore, it should be appreciated that such temporary layer may improve the consistency of the unfinished surface 86 and lead to a faster more efficient sanding procedure.

In embodiments where the finished surface 84 includes a treated surface, the unfinished surface 86 may include an untreated surface. For example, a treatment may be applied to the majority of the outer surface 82 in order to produce the treated surface. In one embodiment, the treatment may be adhered, glued, fixed, sprayed, or painted around strategic locations left untreated to form the finished surface 84 and unfinished surface 86, respectively. It should be appreciated that the outer surface 82 may be marked in order to assist in determining the appropriate location for the unfinished surface 86 prior to applying the treatment to the outer surface 82. In an additional or alternative embodiment, a protective layer may be provided at the desired location of the unfinished surface 86. For example, a temporary layer may be adhered or otherwise affixed to the outer surface 82 of the airfoil 62 such that the treatment may be applied to the remainder of the outer surface 82 to produce the finished surface 84. After completion of the treatment procedure, the temporary layer may be removed, leaving an unfinished surface 86 of the desired size and shape and positioned at the desired location of the unfinished surface 86. Furthermore, it should be appreciated that such temporary layer may improve the consistency of the unfinished surface 86 and lead to a faster more efficient treatment procedure.

Referring still to the exemplary embodiment of FIG. 3, the unfinished surface 86 may generally be placed at any position of the outer surface 82 such that the unfinished surface 86 is configured to introduce turbulence into the fluid flow upstream of an expected shock boundary condition. For example, the unfinished surface 86 may be positioned on the outer surface 82 of the suction side 68 of the airfoil 62. In the embodiment, the unfinished surface 86 may extend along the spanwise direction between 10% and 40% of a length the span S. Further, the unfinished surface 86 may be positioned at least 40% of the span S from the airfoil root 64, such as at least 60% of the span S from the airfoil root 64. Moreover, the unfinished surface 86 may extend to the airfoil tip 66 or may be space apart from the airfoil tip 66. For instance, the outer surface 82 near the airfoil tip 66 (e.g., the outer surface 82 positioned within 10% of the span S from the airfoil tip 66) may include the finished surface 84. Further, the unfinished surface 86 may extend along the chordwise direction between 1% and 10% of a length of the chord C. Furthermore, the unfinished surface 86 may be positioned between 25% and 75% of the chord C from the leading edge 72. It should be appreciated that the unfinished surface 86 may be positioned at any point along the chord C upstream of the expected shock boundary condition and at any point along the span S such that the unfinished surface 86 introduces turbulent flow in the fluid flow upstream of the shock boundary condition.

Referring now to FIGS. 4 and 5, views of boundary layers 92 surrounding an airfoil 62 are illustrated in accordance with aspects of the present subject matter. Particularly, FIG. 4 illustrates a boundary layer 92 of the suction side air 88 on an airfoil 62 with only the finished surface 84, and FIG. 5 illustrates a boundary layer 92 of the suction side air 88 on an airfoil 62 with an unfinished surface 86. Generally fluid flow over the outer surface 82 may be controlled by viscous effects of the fluid flow and is often referred to as a boundary layer 92. Furthermore, the boundary layer 92 may be laminar or turbulent. The fluid flow may generally include a laminar boundary condition 94 at the leading edge 72 and transition to a turbulent boundary condition 96 toward the trailing edge 74. The laminar boundary condition 94 or approximately laminar boundary condition 94 may be characterized by a relatively smooth trajectory or stream lines without any or minimal mixing of layers of the fluid flow. Furthermore, the thickness of the laminar boundary condition 94 may generally increase as the fluid flow travels down the chord C of the airfoil 62. However, as the thickness of the laminar boundary condition 94 increases, the laminar boundary condition 94 may become less stable before eventually transitioning to the turbulent boundary layer 96 (e.g., at a transition point 98). The turbulent boundary condition 96 downstream of the transition point 98 may generally be characterized by random or irregular fluid flow and/or stream lines where layers of the fluid flow mix together. Thus momentum may be exchanged between layers of the fluid flow moving at higher and lower relative speeds. Generally, aerodynamic drag may be reduced by increasing the portion of the boundary layer 92 that includes the laminar boundary condition 92. As such, airfoils 62, such as fan blades 44, may be designed to increase the portion of the boundary layer 92 including the laminar boundary condition 94.

However, in certain situations, the fluid flow over the outer surface 82 of the airfoil 62 may be at least partially supersonic. For instance, the airflow moving past the airfoil 62 may initially be supersonic. In other situations, the suction side air 88 may be accelerated from a subsonic flow to a supersonic flow. In such situations, a shock boundary condition (shock 100) may develop as the fluid flow transition from the supersonic condition to the subsonic condition before traveling through the rest of the gas turbine engine 10. Furthermore, a fluid flow having a laminar boundary condition 94 passing through a shock 100 may result in laminar separation 102 or increase any preexisting laminar separation 102 of the laminar boundary condition 94. Such laminar separation 102 may be undesirable as it may result in a pressure loss that will be higher than for a fully turbulent boundary condition 96 passing through a shock 100.

Referring particularly to FIG. 5, the unfinished surface 86 of the outer surface 82 of the airfoil 62 may be placed in order to transition the fluid flow from the laminar boundary condition 94 to the turbulent boundary condition 96 at the transition point 98 upstream of the shock 100. As such, losses associated with a laminar boundary condition 94 and laminar separation 102 through a shock 100 may be reduced or avoided. Thus, though the laminar boundary condition 94 may generally be more efficient, it may be desirable to selectively trip the laminar boundary condition 94 (or an approximately laminar boundary condition 94) into the turbulent boundary condition 96 (at transition point 98) upstream of the shock 100 to avoid losses due to laminar separation 102 through the shock 100. Preferably, it may be desirable to selectively trip the turbulent boundary condition 96 for only the portion of the fluid flow upstream of the shock 100 that is expected to pass through the shock 100, allowing for the general efficiency gains of the laminar boundary condition 94 while avoiding or reducing the losses associated with laminar separation 102 of the laminar boundary condition 94 over the shock 100.

Figure 6:
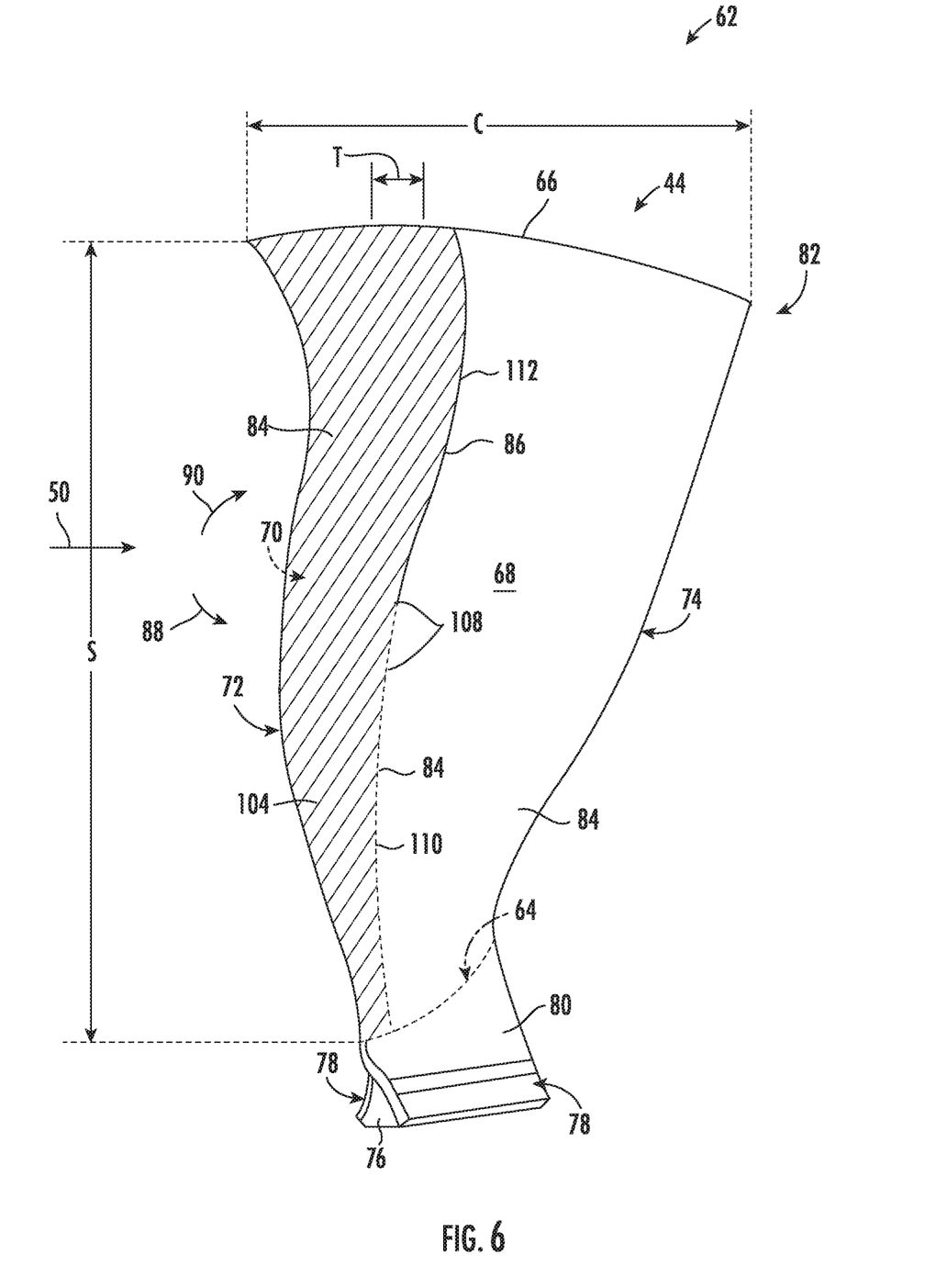
FIG. 6 illustrates a fan blade including a leading edge sheath in accordance with aspects of the present subject matter, particularly illustrating a seam of the leading edge sheath including smoothed and unsmoothed transitions.
Figure 7:
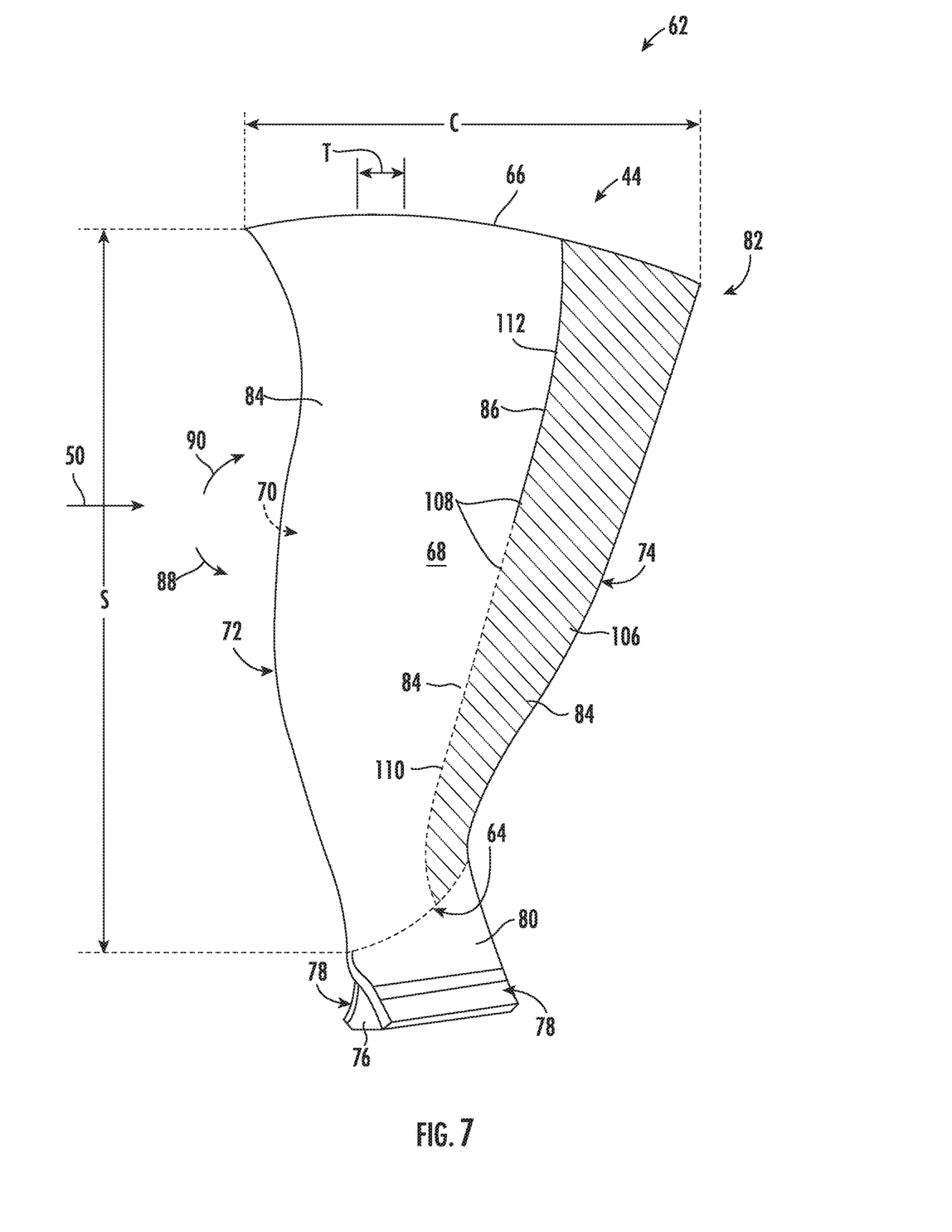
FIG. 7 illustrates a fan blade including a trailing edge sheath in accordance with aspects of the present subject matter, particularly illustrating a seam of the trailing edge sheath including smoothed and unsmoothed transitions.

Referring now to FIGS. 6 and 7, multiple views of the airfoil 62 including sheaths are illustrated in accordance with aspects of the present subject matter. Particularly, FIG. 6 illustrates an embodiment of the airfoil 62 including a leading edge sheath 104, and FIG. 7 illustrates an embodiment of the airfoil 62 including a trailing edge sheath 106. However, other embodiments may include both of the sheaths 104, 106. As illustrated, the sheath(s) 104, 106 may extend from the airfoil root 64 toward the airfoil tip 66, from the airfoil tip 66 toward the airfoil root 64, and/or between the airfoil root 64 and airfoil tip 66 along at least a portion of the span S of the airfoil 62. For instance, the sheath(s) 104, 106 may be bonded to and provide protection for the leading edge 72 and/or trailing edge 74 of the airfoil 62, respectively. It should be recognized that the sheath(s) 104, 106 may be coupled to the leading edge 72 and/or trailing edge 74 using any suitable means, such as by adhesives, tape, welding, and/or mechanical fasteners (e.g., bolts, screws, and rivets). The sheath(s) 104, 106 may generally strengthen the airfoil 62, minimize danger to the airfoil 62 (e.g., the fan blade 44) during a fan blade out event, and protect the airfoil 62 from foreign object damage.

In several embodiments, the sheath(s) 104, 106 may extend along the entire span S. As such, the sheath(s) 104, 106 may protect the entire leading edge 72 and/or trailing edge 74 of the airfoil 62 from the airfoil root 64 to the airfoil tip 66. In other embodiments, the sheath(s) 104, 106 may protect only a portion of the leading edge 72 and/or trailing edge 74 of the airfoil 62, such as a portion toward the airfoil tip 66. As shown, the sheath(s) 104, 106 may extend partially along the chord C on the outer surface 82 of one or both of the suction side 68 or pressure side 70 to one or more seams 108. Furthermore, the outer surface of the sheath(s) 104, 106 may be finished as described generally above in order to form part of the finished surface 84. In other embodiments, the outer surface of the sheath(s) 104, 106 may be formed in a manner to form the smoother finished surface 84 without the need for sanding or the application of a treatment as explained above.

As shown in the embodiments of FIGS. 6 and 7, the seam(s) 108 may be smoothed along a majority of the seam(s) 108. As such, the finished surface 84 may include a smoothed transition (represented by dotted lines 110 in FIGS. 6 and 7) in order to form the laminar boundary condition 94 as described in reference to FIGS. 4 and 5. For instance, the seam(s) 108 may be sanded and/or treated as described above along a majority of the seam(s) 108 in order to form the smoothed transition(s) 110. In a further embodiment, the seam(s) 108 may be machined along a majority of seam(s) 108 in order to gradually taper and form the smoothed transition(s) 110, e.g., the finished surface(s) 84. In another embodiment, the sheath(s) 104, 106 may be formed such that the seam(s) 108 gradually tapers at the desired location of the smoothed transition(s) 110.

As illustrated, at least a portion of the seam(s) 108 may be left unfinished in order to form the unfinished surface 86. For example, the seam 108 on the suction side 68 may be not be smoothed (unsmoothed transition 112) such that the unsmoothed transition 112 introduces turbulence into the fluid flow upstream of an expected shock 100 (see FIG. 5). In certain embodiments, the unsmoothed transition 112 may not be sanded and/or treated as the remaining seam(s) 108, which forms part of the finished surface 84 including the smoothed transition 110. In additional or alternative embodiments, the unsmoothed transition 112 may not be machined as the remaining seam(s) 108 forming the smoothed transition 110. Further, in an additional or alternative embodiment, the sheath(s) 104, 106 may be formed such that the seam(s) 108 do not gradually taper at the location of the unsmoothed transition 112 while the remaining seam(s) 108 is formed to taper at the desired location of the smoothed transition 110.

In several embodiments, the airfoil 62 and/sheath(s) 104, 106 may include at least one of a metal, metal alloy, or composite. For instance, the airfoil 62 and/or sheath(s) 104, 106 may be formed at least partially from a ceramic matrix composite. More particularly, in certain embodiments, the airfoil 62 sheaths 104, 106 may be formed from one or more ceramic matrix composite prepreg plies. For instance, such prepreg plies forming the sheath(s) 104, 106 may be wrapped around the leading edge 72 and/or trailing edge 74 of the airfoil 62 and cured and processed to form the sheath(s) 104, 106, respectively. In other embodiments, the airfoil 62 and/or sheath(s) 104, 106 may be formed at least partially from a metal, such as but not limited to, steel, titanium, aluminum, nickel, or alloys of each. For instance, in certain embodiments, the airfoil 62 and/or sheath(s) 104, 106 may be cast or formed utilizing additive manufacturing. In one particular embodiment, the airfoil 62 may be formed from a ceramic matric composite while the sheath(s) 104, 106 may be formed from a metal. Though, it should be recognized that the airfoil 62 and/or sheath(s) 104, 106 may be formed from multiple materials, such as a combination of metals, metal alloys, and/or composites.

Composite materials may include, but are not limited to, metal matrix composites (MMCs), polymer matrix composites (PMCs), or ceramic matrix composites (CMCs). Composite materials, such as may be utilized in the airfoil 62 and/or the sheath 104, 106 generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., composite plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Similarly, in various embodiments, PMC materials may be fabricated by impregnating a fabric or unidirectional tape with a resin (prepreg), followed by curing. For example, multiple layers of prepreg plies (e.g., composite plies) may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the suction side 68 or the pressure side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

It should be appreciated that after the thermal processing and/or curing process, the airfoil 62 and/or sheath(s) 104, 106 may include the unfinished surface 86 as described herein. Further, at least a portion of the unfinished surface 86 may be finished in order to form the finished surface 84 that is smoother than the unfinished surface 86. Moreover, a portion of the unfinished surface 86 upstream of an expected shock 100 of the fluid flow may be left unfinished in order to introduce turbulence into the fluid flow upstream of the shock 100.

Figure 8:
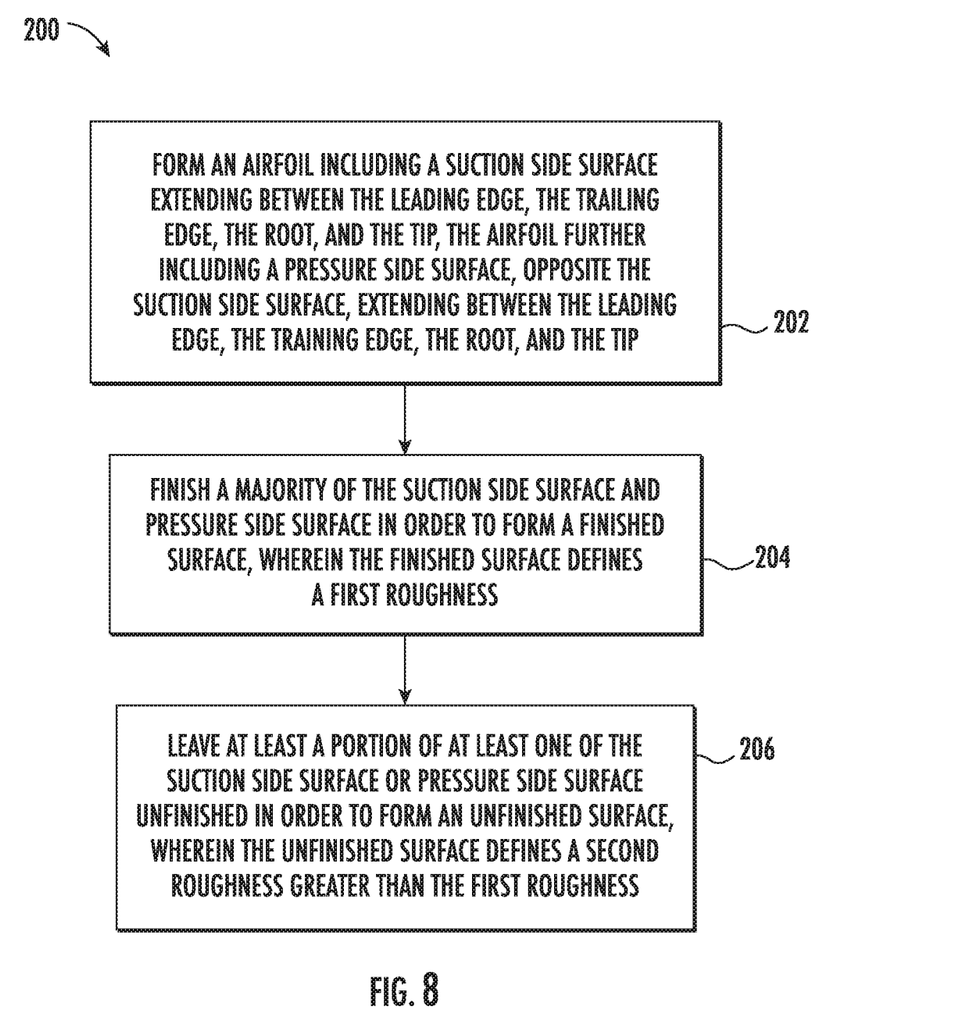
FIG. 8 depicts a method of controlling a transition from a laminar flow to a turbulent flow for an airfoil of a gas turbine engine in accordance with aspects of the present subject matter.

Referring now to FIG. 8 a method 200 of controlling a transition from a laminar flow to a turbulent flow for an airfoil of a gas turbine engine is depicted according to aspects of the present subject matter. Particularly, the method 200 may be utilized with various embodiments of the airfoil 62 as illustrated in FIGS. 3-7. For, instance, the airfoil 62 may define the span S extending in a spanwise direction between the airfoil root 64 and the airfoil tip 66, the chord C extending along the chordwise direction C between the leading edge 72 and a trailing edge 74, and a thickness T extending between the suction side 68 and the pressure side 70.

The method 200 may include, at (202) forming the airfoil including the suction side surface extending between the leading edge, the trailing edge, the root, and the tip and the pressure side surface, opposite the suction side surface, extending between the leading edge, the trailing edge, the root, and the tip. For example, as described above, the airfoil 62 may be formed from a plurality of composite plies, may be a cast, or may be formed via additive manufacturing. Further, the airfoil 62 may be formed such that the outer surface 82 of the airfoil includes the unfinished surface 86.

At (204), the method 200 may include finishing a majority of the suction side surface and pressure side surface in order to form a finished surface. Moreover, the finished surface 84 defines a first roughness. For example, as described above, the outer surface 82 of the airfoil 62 may be sanded or treated along a majority of the outer surface 82 of the suction side 68 and pressure side 70.

At (206), the method 200 may include leaving at least a portion of one or more of the suction side surface or pressure side surface unfinished in order to form an unfinished surface. Furthermore, the unfinished surface 86 may define a second roughness greater than the first roughness. For instance, the unfinished surface 86 may have the same roughness as the airfoil 62 after the method element 202. Further, the finishing process of method element 206 may reduce the roughness of the outer surface 82 of the airfoil 62 along the majority of the outer surface 82 (e.g., forming the finished surface 84). As described above, the portion of the outer surface 82 of one or both of the suctions side 68 or pressure side 70 left unfinished may be placed upstream of the expected shock 100 of the airfoil 62. For instance, the unfinished surface 86 may be on the suction side 68 of the outer surface 82. Furthermore, leaving a portion of the outer surface 82 unfinished may include leaving the unfinished surface 86 unsanded and/or untreated.

As also shown in FIGS. 6 and 7, the method 200 may include coupling one or more sheaths 104, 106 to the leading edge 72 and/or trailing edge 74 of the airfoil 62. As described above, the sheath(s) 104, 106 may extend along the outer surface 82 of the suction side 68 and/or pressure side 70 to one or more seams 108. In such embodiments, finishing the majority of the outer surface 82 may include smoothing the transition between the sheath(s) 104, 106 and the airfoil 62 (e.g., the smoothed transition 110) along a majority of the seam(s) 108. For instance, the majority of the seam(s) 108 may be sanded or treated or the sheath(s) 104, 106 may be formed with a portion that tapers to form the smoothed transition 110. Furthermore, leaving at least a portion of the outer surface 82 of the suction side 68 and/or pressure side 70 unfinished to form the unfinished surface 86 may include leaving a portion of the seam(s) 108 unsmoothed (e.g., unsmoothed transition 112).

As such, the method 200 may also include transitioning the fluid flow across the outer surface 82 of the airfoil 62 from an approximately laminar flow path (e.g., the laminar boundary condition 94) into a turbulent flowpath (e.g., the turbulent boundary condition 96) utilizing the unfinished surface 86. For example, as described above, the transition point 98 may be adjusted to be upstream of the shock 100.

As such, the method 200 may reduce laminar separation 102 at the shock 100 and thus improve the efficiency of the airfoil 62 and gas turbine engine 10.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method of controlling a transition from a laminar flow to a turbulent flow for an airfoil of a turbomachine, the method comprising forming an airfoil defining a span extending along a spanwise direction between a root and a tip and a chord extending along a chordwise direction between a leading edge and a trailing edge, the airfoil including a suction side surface extending between the leading edge, the trailing edge, the root, and the tip, the airfoil further including a pressure side surface, opposite the suction side surface, extending between the leading edge, the trailing edge, the root, and the tip; finishing a majority of the suction side surface and pressure side surface in order to form a finished surface, wherein the finished surface defines a first roughness; and leaving at least a portion of at least one of the suction side surface or pressure side surface unfinished in order to form an unfinished surface, wherein the unfinished surface defines a second roughness greater than the first roughness.

2. The method of clause 1, further comprising transitioning, utilizing the unfinished surface, a fluid flow across the airfoil from an approximately laminar flowpath into a turbulent flowpath.

3. The method of any preceding clause, wherein leaving at least a portion of at least one of the suction side surface or pressure side surface unfinished comprises leaving at least a portion of at least one of the suction side surface or pressure side surface configured to be upstream of an expected shock boundary condition of the airfoil unfinished in order to form the unfinished surface.

4. The method of any preceding clause, wherein leaving at least a portion of at least one of the suction side surface or pressure side surface unfinished in order to form unfinished surface comprises leaving at least a portion of the suction side surface unfinished.

5. The method of any preceding clause, wherein finishing a majority of the suction side surface and pressure side surface in order to form the finished surface comprises sanding a majority of the suction side surface and pressure side surface, and wherein leaving at least a portion of at least one of the suction side surface or pressure side surface unfinished in order to form the unfinished surface comprises leaving at least a portion of at least one the suction side surface or pressure side surface unsanded.

6. The method of any preceding clause, wherein finishing a majority of the suction side surface and pressure side surface in order to form the finished surface comprises applying a treatment to a majority of the suction side surface and pressure side surface, and wherein leaving at least a portion of at least one of the suction side surface or pressure side surface unfinished in order to form the unfinished surface comprises leaving at least a portion of at least one the suction side surface or pressure side surface untreated.

7. The method of any preceding clause, further comprising coupling a sheath to one of the leading edge or the trailing edge of the airfoil, the sheath extending partially along the span on at least one of the pressure side surface or suction side surface to at least one seam, wherein finishing a majority of the suction side surface and pressure side surface in order to form the finished surface comprises smoothing a transition between the sheath and the airfoil along a majority of the at least one seam, and wherein leaving at least a portion of at least one of the suction side surface or pressure side surface unfinished in order to form the unfinished surface comprises leaving at least a portion the seam unsmoothed.

8. The method of any preceding clause, wherein the unfinished surface defines a spanwise length extending along the spanwise direction between 10% and 40% of a length of the span.

9. The method of any preceding clause, wherein the unfinished surface is positioned at least 40% of the span from the root.

10. The method of any preceding clause, wherein the unfinished surface defines a chordwise length extending along the chordwise direction between 1% and 10% of a length of the chord.

11. The method of any preceding clause, wherein the unfinished surface is position between 5% and 75% of the chord.

12. The method of any preceding clause, wherein the airfoil is configured as a fan blade of an aero-engine 13. An airfoil for a turbomachine defining a span extending along a spanwise direction between a root and a tip and a chord extending along a chordwise direction between a leading edge and a trailing edge, the airfoil comprising a suction side surface extending between the leading edge, the trailing edge, the root, and the tip; a pressure side surface, opposite the suction side surface, extending between the leading edge, the trailing edge, the root, and the tip; a finished surface comprising a majority of a combination of the suction side surface and the pressure side surface, wherein the finished surface defines a first roughness; an unfinished surface comprising at least a portion of the remaining suction side surface, pressure side surface, or both, wherein the unfinished surface defines a second roughness greater than the first roughness.

14. The airfoil of clause 13, wherein the unfinished surface is positioned along the chord such that the unfinished surface is configured to be upstream of an expected shock boundary condition of the airfoil.

15. The airfoil of any preceding clause, wherein the unfinished surface is configured to transition a fluid flow across the airfoil from an approximately laminar flowpath into a turbulent flowpath.

16. The airfoil of any preceding clause, wherein the unfinished surface is positioned on the suction side surface.

17. The airfoil of any preceding clause, wherein the finished surface comprises a sanded surface and the unfinished surface comprises an unsanded surface.

18. The airfoil of any preceding clause, wherein the finished surface comprises a treated surface, and the unfinished surface comprises an untreated surface.

19. The airfoil of any preceding clause, further comprising a leading edge sheath coupled to the leading edge of the airfoil and extending partially along the span on at least one of the pressure side surface or suction side surface to at least one seam, wherein at least a portion of the at least one seam comprises the unfinished surface.

20. The airfoil of any preceding clause, further comprising a trailing edge sheath coupled to the trailing edge of the airfoil and extending partially along the span on at least one of the pressure side surface or suction side surface to at least one seam, wherein at least a portion of the at least one seam comprises the unfinished surface.

21. The airfoil of any preceding clause, wherein the unfinished surface defines a spanwise length extending along the spanwise direction between 10% and 40% of a length of the span.

22. The airfoil of any preceding clause, wherein the unfinished surface is positioned at least 40% of the span from the root.

23. The airfoil of any preceding clause, wherein the unfinished surface defines a chordwise length extending along the chordwise direction between 1% and 10% of a length of the chord.

24. The airfoil of any preceding clause, wherein the unfinished surface is position between 5% and 75% of the chord.

25. The airfoil of any preceding clause, wherein the airfoil is configured as a fan blade of an aero-engine.

What is claimed is:

1. A method of controlling a transition from a laminar flow to a turbulent flow for an airfoil of a turbomachine, the method comprising:
forming an airfoil defining a span extending along a spanwise direction between a root and a tip and a chord extending along a chordwise direction between a leading edge and a trailing edge, the airfoil including a suction side surface extending between the leading edge, the trailing edge, the root, and the tip, the airfoil further including a pressure side surface, opposite the suction side surface, extending between the leading edge, the trailing edge, the root, and the tip;
finishing a majority of the suction side surface and pressure side surface in order to form a finished surface, wherein the finished surface defines a first roughness; and
leaving at least a portion of at least one of the suction side surface or pressure side surface unfinished in order to form an unfinished surface upstream of an expected shock boundary condition of the airfoil to transition from an approximately laminar flow to a turbulent flow upstream of the expected shock boundary condition, wherein the unfinished surface defines a second roughness greater than the first roughness.

2. The method of claim 1, further comprising:
transitioning, utilizing the unfinished surface, a fluid flow across the airfoil from an approximately laminar flowpath into a turbulent flowpath.

3. The method of claim 1, wherein leaving at least a portion of at least one of the suction side surface or pressure side surface unfinished in order to form unfinished surface comprises leaving at least a portion of the suction side surface unfinished.

4. The method of claim 1, wherein finishing a majority of the suction side surface and pressure side surface in order to form the finished surface comprises sanding a majority of the suction side surface and pressure side surface, and wherein leaving at least a portion of at least one of the suction side surface or pressure side surface unfinished in order to form the unfinished surface comprises leaving at least a portion of at least one the suction side surface or pressure side surface unsanded.

5. The method of claim 1, wherein finishing a majority of the suction side surface and pressure side surface in order to form the finished surface comprises applying a treatment to a majority of the suction side surface and pressure side surface, and wherein leaving at least a portion of at least one of the suction side surface or pressure side surface unfinished in order to form the unfinished surface comprises leaving at least a portion of at least one the suction side surface or pressure side surface untreated.

6. A method of controlling a transition from a laminar flow to a turbulent flow for an airfoil of a turbomachine, the method comprising:
- forming an airfoil defining a span extending along a spanwise direction between a root and a tip and a chord extending along a chordwise direction between a leading edge and a trailing edge, the airfoil including a suction side surface extending between the leading edge, the trailing edge, the root, and the tip, the airfoil further including a pressure side surface, opposite the suction side surface, extending between the leading edge, the trailing edge, the root, and the tip;
- finishing a majority of the suction side surface and pressure side surface in order to form a finished surface, wherein the finished surface defines a first roughness;
- leaving at least a portion of at least one of the suction side surface or pressure side surface unfinished in order to form an unfinished surface, wherein the unfinished surface defines a second roughness greater than the first roughness; and
- coupling a sheath to one of the leading edge or the trailing edge of the airfoil, the sheath extending partially along the span on at least one of the pressure side surface or suction side surface to at least one seam,
- wherein finishing a majority of the suction side surface and pressure side surface in order to form the finished surface comprises smoothing a transition between the sheath and the airfoil along a majority of the at least one seam, and wherein leaving at least a portion of at least one of the suction side surface or pressure side surface unfinished in order to form the unfinished surface comprises leaving at least a portion the seam unsmoothed.

7. An airfoil for a turbomachine defining a span extending along a spanwise direction between a root and a tip and a chord extending along a chordwise direction between a leading edge and a trailing edge, the airfoil comprising:
- a suction side surface extending between the leading edge, the trailing edge, the root, and the tip;
- a pressure side surface, opposite the suction side surface, extending between the leading edge, the trailing edge, the root, and the tip;
- a finished surface comprising a majority of a combination of the suction side surface and the pressure side surface, wherein the finished surface defines a first roughness;
- an unfinished surface comprising at least a portion of the remaining suction side surface, pressure side surface, or both, wherein the unfinished surface defines a second roughness greater than the first roughness surface, the unfinished surface being upstream of an expected shock boundary condition of the airfoil to transition from an approximately laminar flow to a turbulent flow upstream of the expected shock boundary condition.

8. The airfoil of claim 7, wherein the unfinished surface is configured to transition a fluid flow across the airfoil from an approximately laminar flowpath into a turbulent flowpath.

9. The airfoil of claim 7, wherein the unfinished surface is positioned on the suction side surface.

10. The airfoil of claim 7, wherein the finished surface comprises a sanded surface and the unfinished surface comprises an unsanded surface.

11. The airfoil of claim 7, wherein the finished surface comprises a treated surface, and the unfinished surface comprises an untreated surface.

12. The airfoil of claim 7, further comprising:
- a leading edge sheath coupled to the leading edge of the airfoil and extending partially along the span on at least one of the pressure side surface or suction side surface to at least one seam, wherein at least a portion of the at least one seam comprises the unfinished surface.

13. The airfoil of claim 7, further comprising:
- a trailing edge sheath coupled to the trailing edge of the airfoil and extending partially along the span on at least one of the pressure side surface or suction side surface to at least one seam, wherein at least a portion of the at least one seam comprises the unfinished surface.

14. The airfoil of claim 7, wherein the unfinished surface defines a spanwise length extending along the spanwise direction between 10% and 40% of a length of the span.

15. The airfoil of claim 7, wherein the unfinished surface is positioned at least 40% of the span from the root.

16. The airfoil of claim 7, wherein the unfinished surface defines a chordwise length extending along the chordwise direction between 1% and 10% of a length of the chord.

17. The airfoil of claim 7, wherein the unfinished surface is positioned between 5% and 75% of the chord.

18. The airfoil of claim 7, wherein the airfoil is configured as a fan blade of an aero-engine.

* * * * *